United States Patent [19]
Albertson

[11] 4,017,388
[45] Apr. 12, 1977

[54] SPLIT TREATMENT PHOSPHORUS REMOVAL FROM WASTE

[75] Inventor: Orris E. Albertson, Norwalk, Conn.

[73] Assignee: Dorr-Oliver Incorporated, Stamford, Conn.

[22] Filed: Jan. 26, 1973

[21] Appl. No.: 326,795

Related U.S. Application Data

[63] Continuation-in-part of Ser. No. 145,579, May 20, 1971, abandoned, which is a continuation-in-part of Ser. No. 852,280, Aug. 22, 1969, abandoned.

[52] U.S. Cl. .............................. 210/5; 210/DIG. 29
[51] Int. Cl.² .......................................... C02B 1/02
[58] Field of Search ................................ 210/3–9, 210/18, 45, 46, DIG. 29

[56] References Cited

UNITED STATES PATENTS

| 937,992 | 10/1970 | Sutro | 210/46 |
| 3,238,128 | 3/1966 | Gustafson | 210/46 |
| 3,338,828 | 8/1967 | Clark | 210/54 X |
| 3,408,289 | 10/1968 | Gustafson | 210/46 X |
| 3,423,309 | 1/1969 | Albertson | 210/5 |
| 3,440,165 | 4/1969 | Davis et al. | 210/4 |
| 3,623,975 | 11/1971 | Cardinal et al. | 210/6 |

Primary Examiner—Thomas G. Wyse
Attorney, Agent, or Firm—Theodore M. Jablon; Burtsell J. Kearns

[57] ABSTRACT

A process and apparatus for economically removing algae producing phosphorus, from sewage by separating sludge from the sewage, recirculating the sludge, mixing into this the lime needed to bring the pH up to 11.0 or more and then mixing the limed sludge with the raw feed to a pH of 10.5 or under to precipitate more phosphorus from the total flow than would result from an equal amount of lime fed directly into the total flow. This result is also obtained by splitting the feed and heavily dosing one part with lime before returning it to the remainder of the feed.

The high pH reached in the heavily dosed part also produces a water softening effect, which makes the sludge easier to dewater and the effluent more acceptable for discharge or reuse. Additional precipitation is economically secured by mixing polyvalent metal salts or polyelectrolytes with the lime treated waste material before separation of the lime sludge from the waste material effluent.

1 Claim, 2 Drawing Figures

INVENTOR.
ORRIS E. ALBERTSON
BY *George S Hastings*
ATTORNEY.

SPLIT TREATMENT PHOSPHORUS REMOVAL FROM WASTE

This is a continuation of application Ser. No. 145,579 filed May 20, 1971, which in turn is a continuation of application Ser. No. 852,280 filed Aug. 22, 1969, both now abandoned.

OBJECTS AND ADVANTAGES OF THE INVENTION

This is an improvement on the process and apparatus set forth in my patents No. 3,386,911 and 3,423,309 to which reference is made for a fuller statement of the general objectives and problems in economical removal of a major algae producing nutrient, phosphorus, hereafter sometimes referrred to as P from sewage and the like by combined chemical and biological treatment.

The increased present day usage of phosphorus containing detergents, fertilizer and other chemical compounds has resulted in serious and increasing deterioration of natural waters as a result of algae formation. The principal obstacle to removing the phosphorus nutrient required for algae growth by chemical precipitants has been the cost of chemicals and adding a number of process steps increasing capital costs. The volume of sewage to be treated, is so large, that cost of chemicals used is critical and it is imperative that the usage of chemicals per million gallons per day be held to a minimum.

It is an object of the invention to improve on Applicant's patents above referred to by still further reducing the cost of chemicals issued in extracting phosphorus from liquid waste material such as sewage.

Since lime is the least expensive material commonly used as a precipitant and coagulant in water treatment, it is a particular object of the present invention to secure a greater P removal for the quantity of lime used than hitherto possible. Another object is to secure a water softening effect, rendering the resulting sludges more easily dewatered, along with the efficient removal of P. Also by increased precipitation of calcium phosphorus compounds the effluent is rendered lower in calcium content and its discharge is more acceptable, particularly if it is to be reused. Still another object is the more economical use of auxiliary chemical precipitants for scavenging remaining P residues and further clarifying the effluent.

A principal feature of the invention lies in separating the feed to a flocculator and clarifier or other liquid solid separator, into two parts one of which may be heavily dosed with lime to a relatively high pH and then mixing this part with the other part to reduce the pH to that which normally result from applying the lime to the entire feed of sewage.

A further advantage of this heavy dosage of part only of the total flow is that raising the pH over 10.5 has a water softening effect which resulting in a more easily dewatered lime sludge. This is important because of the volume and the known resistance to dewatering of lime sludges resulting from conventional treatment of sewage and like wastes with lime at lower pH's.

When the heavily dosed part is thereafter mixed with the raw feed to bring the pH down to 9.5 or less proportionately more phosphates and other P compounds have been precipitated from the heavily dosed part than if treated to a 9.5 pH, and thus when the heavily dosed part is mixed with the rest of the flow there is a decrease in P over what would result from treating all of the feed with the same amount of lime to a final 9.5 pH.

DESCRIPTION OF THE DRAWINGS

Referring to the drawings.

DETAILED DESCRIPTION OF THE INVENTION

Figure 1:
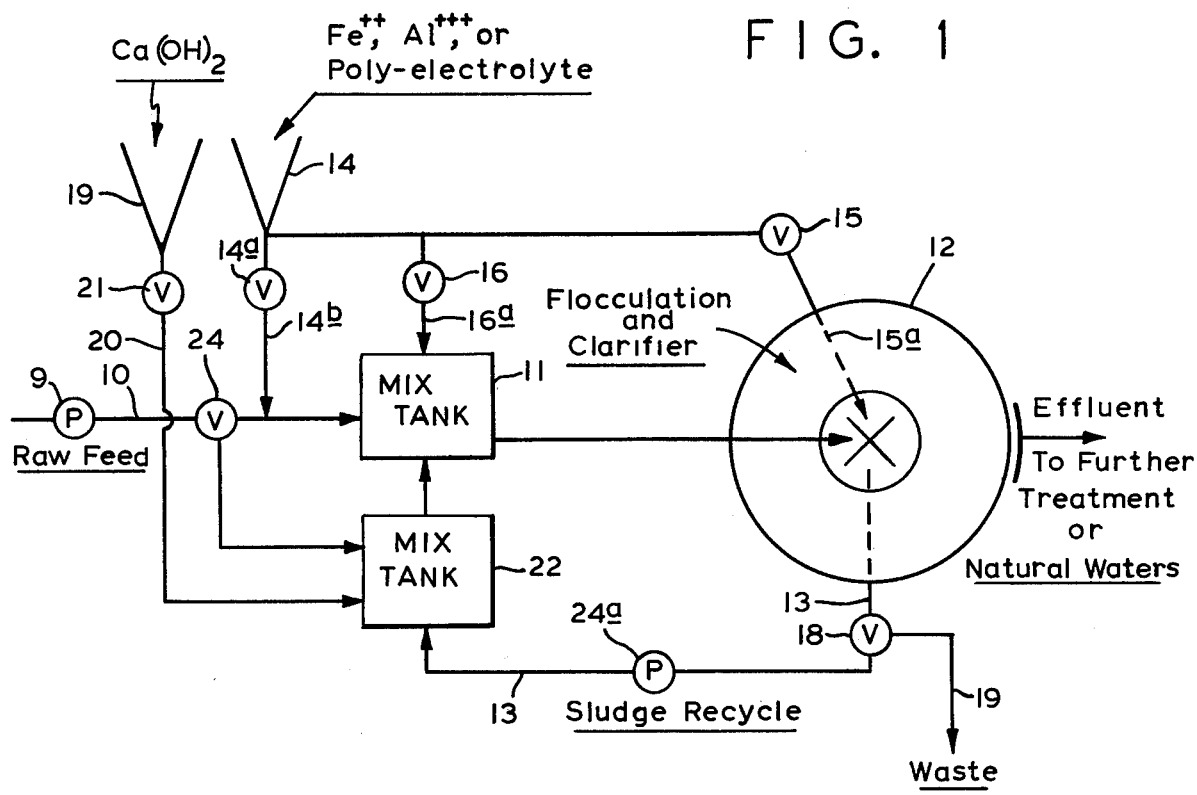
FIG. 1 is a diagrammatic flowsheet illustrating a process and apparatus embodying the invention.

As shown in FIG. 1, raw sewage or other liquid organic waste material is pumped by pump 9 or gravity fed through feed pipe 10 to mix tank 11 and thence to flocculating clarifier 12. This clarifier may be similar to that in U.S. Pat. No. 2,268,475 to Darby which separates the solids containing sludge in an underflow from a relatively clear effluent overflow. A centrifuge or filter may be substituted for this purpose, or a flocculator delivering to a separate clarifier may be used. The underflow of the clarifier 12 is fed to conduit 13 through proportioning valve 18 by a variable rate pump 24a to a reaction or mix tank 22. By operation of the proportioning valve any proportion or all of the sludge from the clarifier may be fed to waste pipe 19a. By increasing the rate of underflow by variable rate pump 24a any rate of recycle up to 100% may be secured though normally a recycle in the range between 15 and 75% has been found satisfactory. The mix tanks 11 and 22 are provided with a conventional mixing device such as the "Flash Mixer".

A hopper 19 containing lime is connected through a conduit 20 and valve 21 to the mix tank 22 by which an amount of lime is fed to the mix tank 22 sufficient to increase the pH of the sludge in the tank to over 10.5 and preferably 11.0 or more. At 50% sludge recycle a retention time of about 2 minutes in the tank has been found sufficient. The thus heavily dosed sludge is then fed to the mix tank 11 in which the sludge is mixed with the raw feed in a proportion, for example, of two parts of raw feed to one of recycled material which results in reducing the pH to 9.5 or below. Preferably 15 to 75% of the sludge is recirculated, 50% recirculation being considered effective, the remainder going to waste and thus continuously removing P precipitated by the lime from the system.

A similar result can be obtained, preferably accompanied by reducing or eliminating the recycle of underflow from the clarifier 12, by splitting the raw feed 10 by means of a proportioning valve 24 and conduit 26 and supplying, for example, up to one half of the raw feed to mix tank 22 and applying an entire lime dosage of say 300 mg per liter to that portion and thereafter mixing this heavily dosed portion with the balance of the raw feed flow in mix tank 11. Varying porportions of split feed and recycled sludge may be fed to the mix tank 22, while maintaining approximately the same dosage and pH.

Applicant in his preferred form has a separate mix tank 11 for mixing the heavily lime dosed feed part or sludge with the remainder of the raw feed. However an alternative is to eliminate the mix tank 11 and feed the heavily dosed material directly to the Flocculator—such as that shown in said patent 2,268,475. This flocculator with its moving blades will thus constitute a mixing zone in which the pH is brought down to 9.5 or less depending on the P residual desired.

In order to obtain a further reduction of P residue and to secure a higher degree of clarification of sewage effluents, or to secure the desired clarification without employing a flocculator, it is often desirable to use other precipitating or coagulating chemicals in addition to the more inexpensive lime such as bivalent and trivalent metal salts such as alum or ferric cloride or one of the polyelectrolytes such as disclosed in U.S. Pat. No. 3,442,799 to Glavis et al. Applicant believes that the effectiveness of the additional more expensive coagulants referred to is increased if used together with the lime before separation of the precipitates in the clarifer, while retaining the economy which results from using the less expensive lime to remove the major part of the P, and the more expensive precipitants to scavenge the remainder.

Hence Applicant provides for controlled feed of the polyvalent metal salts or polyelectrolyte from hopper 14 through adjustable valve 14a and conduit 14b to the raw feed, or alternatively through valves 15 and 16 and conduits 15a and 16a respectively to the flocculation tank 12 and the mix tank 11. By manipulating the valves 14a, 15 and 16 the additional chemical can be fed to any one of the above-mentioned locations.

EXAMPLES

Figure 2:
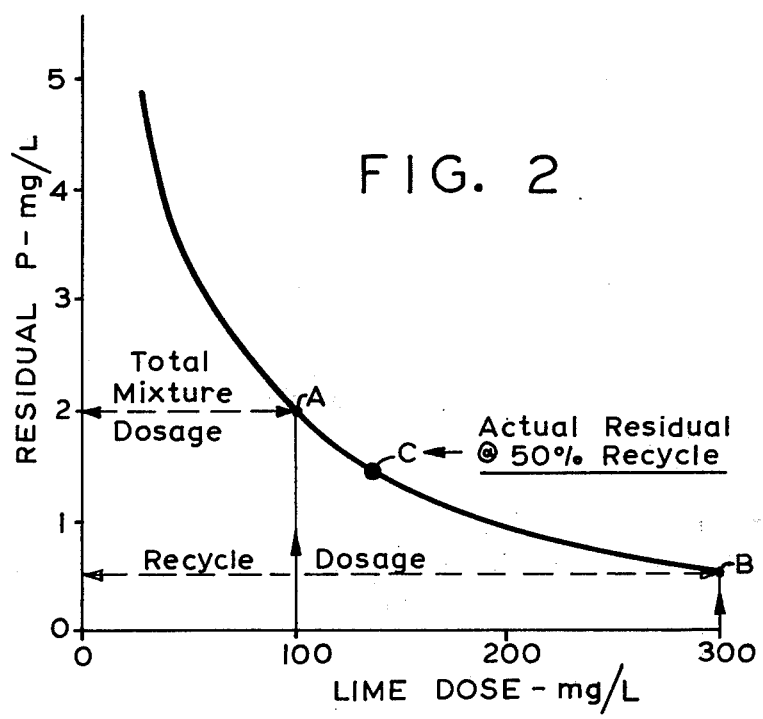
FIg. 2 is a graph comparing the results of municipal sewage test runs employing the invention with test runs in which the invention is not employed.

FIG. 2 illustrates an example of the operation and advantages of the invention taken from an experimental run at a municipal sewage plant. In this run an amount of underflow sludge from the clariflocculator equal to 50% of the raw feed flow was recycled to a first mixing tank. This 50% already at pH 9.5 containing 180 mg of lime per liter and was dosed with 360 mg of lime per liter of recycle (equal to 180 mg of lime per liter of new flow) bringing the pH above 11 in a reaction tank such as tank 22. At 50% recycle the lime addition in this tank is three times as concentrated than if applied to the total flow of raw feed and recycle and would bring the pH to approximately 11 or more with most sewages. This heavily dosed recycled material was then mixed with the raw feed in a second mixing tank bringing the pH of the total flow down to 9.0 to 9.5. The actual residue P was found to be about 1.5 mg per liter illustrated on the curve in FIG. 2 by point c. When a similar run was made dosing the total flow of 100% of raw feed plus 50% recycle with 180 mg of lime per liter of new raw feed, equal in lime quantity to the 360 mg per liter previously applied to the 50% recycle, it was found that the P residual was about 2.0 per liter. A considerable number of such test runs were made. While there were variations in results of test runs, believed due to variations in the sewage composition, residues were consistently less when a given amount of lime was added to the recycled underflow as compared with adding the same amount of lime to the entire flow.

While the present invention has been illustrated and described by reference to a preferred embodiment and example thereof, it will be understood that the scope of the invention is to be determined by the following claims.

What I claim is:

1. A method for precipitating algae producing phosphorous from sewage, wherein the incoming sewage flow is treated with lime to effect precipitation of phosphate, and the thus treated sewage is then subjected to a flocculation and clarification operation producing an overflow of clarified sewage and phosphate sludge as underflow, characterized thereby that an amount of underflow sludge equal to about 50% of the incoming raw feed flow, containing about 180 mg. of lime per liter at a pH of about 9.0 to 9.5, is recycled to a first mixing stage, that about 360 mg. of lime is added per liter of recycle sludge in said first mixing stage, equal to about 180 mg. of lime per liter of incoming feed, thereby raising the pH to about 11 with concurrent water softening effect, and that the thus treated recycled material is mixed with the incoming raw feed in a second mixing stage, thereby lowering the pH of the total flow to 9.0 to 9.5 with a resultant net phosphate precipitate contained in said underflow sludge derived from said flocculation and clarification operation.

* * * * *

UNITED STATES PATENT AND TRADEMARK OFFICE
CERTIFICATE OF CORRECTION

PATENT NO. : 4,017,388
DATED : April 12, 1977
INVENTOR(S) : Orris E. Albertson

It is certified that error appears in the above-identified patent and that said Letters Patent are hereby corrected as shown below:

Change Item [63] of the Synopsis Sheet to:

"[63] Continuation of Serial No. 145,579, May 20, 1971, abandoned, which is a continuation of Serial No. 852,280, August 2, 1969, abandoned"

Signed and Sealed this thirtieth Day of August 1977

[SEAL]

Attest:

RUTH C. MASON
*Attesting Officer*

C. MARSHALL DANN
*Commissioner of Patents and Trademarks*